United States Patent
Zhao (10) Patent No.: US 9,680,913 B2
(45) Date of Patent: Jun. 13, 2017

(54) SYSTEM AND METHOD FOR TRANSMITTING FILE BASED ON AUDIO SIGNAL

(71) Applicant: Guangzhou Kugou Computer Technology Co. Ltd., Guangzhou (CN)

(72) Inventor: Weifeng Zhao, Guangdong (CN)

(73) Assignee: Guangzhou Kugou Computer Technology Co., Ltd., Guangzhou (CN)

( * ) Notice: Subject to any disclaimer, the term of this patent is extended or adjusted under 35 U.S.C. 154(b) by 429 days.

(21) Appl. No.: 14/460,123

(22) Filed: Aug. 14, 2014

(65) Prior Publication Data

US 2014/0359083 A1 Dec. 4, 2014

Related U.S. Application Data

(63) Continuation of application No. PCT/CN2014/074012, filed on Mar. 25, 2014.

(30) Foreign Application Priority Data

May 22, 2013 (CN) .......................... 2013 1 0191429

(51) Int. Cl.
*H04L 29/08* (2006.01)
*H04B 11/00* (2006.01)

(52) U.S. Cl.
CPC .............. *H04L 67/06* (2013.01); *H04B 11/00* (2013.01)

(58) Field of Classification Search
None
See application file for complete search history.

(56) References Cited

U.S. PATENT DOCUMENTS

2008/0027734 A1* 1/2008 Zhao .................... G10L 19/018
704/502

\* cited by examiner

*Primary Examiner* — Ranodhi Serrao
(74) *Attorney, Agent, or Firm* — Haug Partners LLP; William S. Frommer (57) ABSTRACT

A method for transmitting files based on an audio signal includes a first terminal and a second terminal, the first terminal receives a file identification of a target file transmitted by a server; obtains a first audio signal, hiding the file identification in the first audio signal to form a first signal, and plays the first signal; a second terminal samples at least a portion of the first signal, and gets the file identification according to the at least a portion of the first signal; transmits the file identification to the server; the server sends the target file to the second terminal according to the file identification.

5 Claims, 4 Drawing Sheets

SYSTEM AND METHOD FOR TRANSMITTING FILE BASED ON AUDIO SIGNAL

CROSS REFERENCE TO RELATED APPLICATIONS

This application is a U.S. continuation application under 35 U.S.C. §111(a) claiming priority under 35 U.S.C. §§120 and 365(c) to International Application No. PCT/CN2014/074012 filed Mar. 25, 2014, which claims the priority benefit of Chinese Patent Application No. 201310191429.9 filed May 22, 2013, the contents of which are incorporated by reference herein in their entirety for all intended purposes.

FIELD

The disclosure relates to internet fields, and particularly to a system and method for transmitting files based on an audio signal.

BACKGROUND

The section provides background information related to the present disclosure which is not necessarily prior art.

Presently, transmitting files between terminals is widely used today. For example, the files are transmitted between computers in offices. Currently, files are mainly transmitted between terminals through a data cable, a wired network, wireless network or Bluetooth. And above-mentioned file transmissions need a third-party platform. For example, files can be transmitted through the data cable, the wired network, the wireless network or the Bluetooth. That is, before transmitting files between terminals, a third-party platform needs to be established, for instance, connecting to the data cable, connecting to the wired network, connecting to the wireless network or connecting to the Bluetooth. However, this existing file transmission process is more complicated.

SUMMARY

The disclosed method and system for transmitting files based on audio signals are directed to solve one or more problems set forth above and other problems.

This section provides a general summary of the disclosure, and is not a comprehensive disclosure of its full scope or all of its features.

Further areas of applicability will become apparent from the description provided herein. The description and specific examples in this summary are intended for purposes of illustration only and are not intended to limit the scope of the present disclosure.

A method for transmitting files based on an audio signal, comprises:

a first terminal receiving a file identification of a target file transmitted by a server;

the first terminal generating a first audio signal, hiding the file identification in the first audio signal to form a first signal, and plays the first signal;

a second terminal sampling at least a portion of the first signal, and getting the file identification according to the at least a portion of the first signal;

the second terminal getting a target file according to the file identification.

A method for transmitting files based on an audio signal, comprises:

receiving a file identification of a target file transmitted by the server;

generating a first audio signal;

hiding the file identification in the first audio signal to form a first signal;

playing the first signal, to make a second terminal sample at least a portion of the first signal to construct a second audio signal, and decode the second audio signal to get the file identification, transmit the file identification to a server, and obtain the target file transmitted by the server according to the file identification.

A method for transmitting files based on an audio signal, comprises:

sampling at least a portion of the first signal played by a first terminal to construct a second audio signal;

decoding the second audio signal to get the file identification, wherein the file identification is the file identification of the target file hidden in the first audio signal, the file identification is the file identification transmitted from the server to the first terminal;

transmitting the file identification to a server;

receiving the target file transmitted by the server according to the file identification.

A system for transmitting files based on an audio signal, comprises:

a first terminal comprising:

a receiving unit configured to receive a transmitted file identification of a target file;

a hiding unit configured to generate a first audio signal, and hide the file identification into the first audio signal to form a first signal;

a playing unit configured to play the first signal.

a second terminal comprising:

a decoding unit configured to sample at least a portion of the first signal, and get the file identification according to the at least a portion of the first signal;

A non-transitory computer readable storage medium, storing one or more programs for execution by one or more processors of a computer having a display, the one or more programs comprise instructions for:

a first terminal receiving a file identification of a target file transmitted by a server;

a first terminal obtaining a first audio signal, hiding the file identification in the first audio signal to form a first signal, and plays the first signal;

a second terminal sampling at least a portion of the first signal, and getting the file identification according to the at least a portion of the first signal;

the second terminal getting a target file according to the file identification.

BRIEF DESCRIPTION OF THE DRAWINGS

In order to illustrate the embodiments or existing technical solutions more clearly, a brief description of drawings that assists the description of embodiments of the invention or existing art will be provided below. It would be apparent that the drawings in the following description are only for some of the embodiments of the invention. A person having ordinary skills in the art will be able to obtain other drawings on the basis of these drawings without paying any creative work.

DETAILED DESCRIPTION OF ILLUSTRATED EMBODIMENTS

Technical solutions in embodiments of the present invention will be illustrated clearly and entirely with the aid of the drawings in the embodiments of the invention. It is apparent that the illustrated embodiments are only some embodiments of the invention instead of all of them. Other embodiments that a person having ordinary skills in the art obtains based on the illustrated embodiments of the invention without paying any creative work should all be within the protection scope sought by the present invention.

Figure 1:
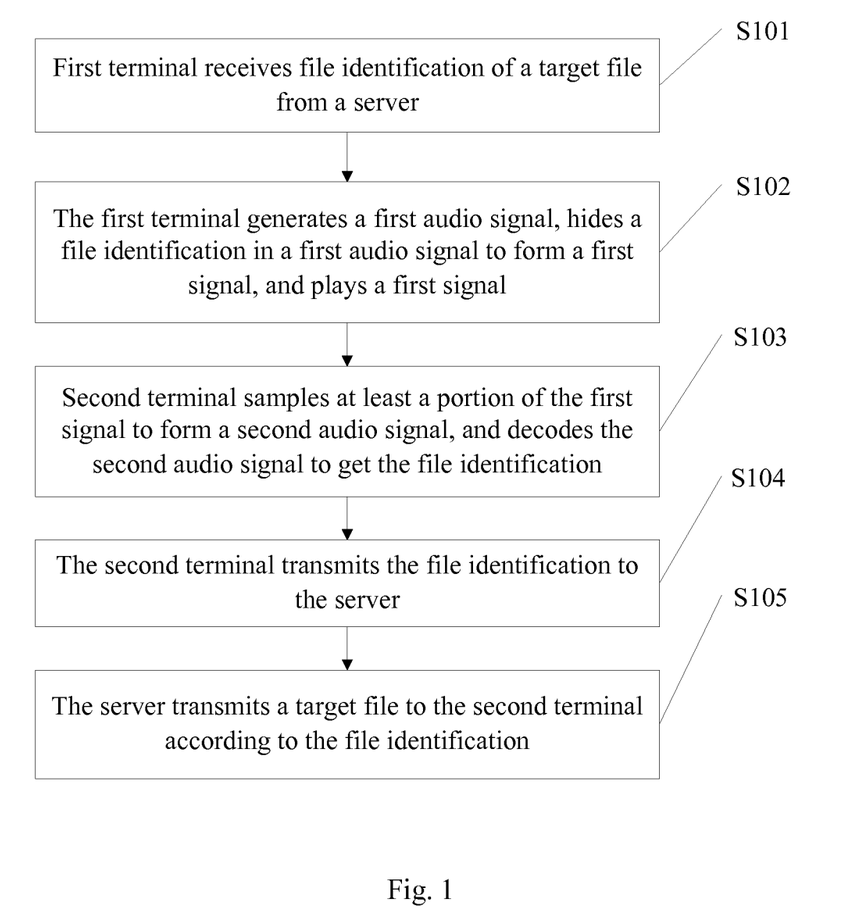
FIG. 1 is a flowchart of an example of a method for transmitting files based on an audio signal according to various embodiments.

Referring to FIG. 1, it is a flowchart of an example of a method for transmitting files based on an audio signal. The method may include the following steps 101 to 105.

Step 101: a first terminal receives a file identification of a target file from a server.

Step 102: obtaining a first audio signal, hiding the file identification in the first audio signal to form a first signal, and plays the first signal. The first audio signal is generated by the first terminal. The first audio signal also can be generated by the server, and the server sends the first audio signal to the first terminal.

Step 103: a second terminal samples at least a portion of the first signal to form a second audio signal, and decodes the second audio signal to get the file identification.

Step 104: the second terminal transmits the file identification to the server.

Step 105: the server transmits the target file to the second terminal according to the file identification.

It should be noted that the file identification is hidden in the first audio signal. Change of the first audio signal is less. Users cannot feel a difference between the audio signal with the hidden file identification and the audio signal without the hidden file identification. For example, the first audio signal of the first signal may be a piece of music. When users receive the first signal, the users only hear the first audio signal (the piece of music), do not feel the file identification hidden in the piece of music. Therefore, when files hidden in the piece of music is transmitting, the users can still hear the piece of music.

Preferably, the first and second terminals may be equipments having audio hardware, such as mobile phones, table personal computers, computers, music players (such as MP3, MP4, MP5).

Preferably, the target file may be files that can be stored in the first and second terminals, such as an audio file, a video file, an image file, a document file.

Preferably, the first audio signal may be a piece of music, a piece of sinusoidal signal, a piece of sound, or a piece of noise.

Preferably, the second audio signal may be audio signals constituted by at least a portion of the first signal picked up by the second terminal. That is, the second audio signal approximates the first signal, or equates the first signal.

Preferably, the target file may be the file pre-stored in the server by the first terminal. The target file also may be the file pre-obtained and stored by the server.

As a preferably embodiment, the first terminal can hide the file identification, a check code and an identifier in the first audio file. The first terminal may generate the check code, or the first terminal consults with the second terminal in advance to generate the check code together. The identifier is used to mark a location of hiding the file identification and the check code. That is, the first terminal hiding the file identification in the first audio signal may include the following contents.

The first terminal hides the file identification, the identifier, and the check code in the first audio signal. Specifically, the identifier is used to mark the location of hiding the file identification and the check. The identifier may mark from which segment the file identification and the check code is hidden. Therefore, the second terminals can obtain the file identification and the check code from a segment, corresponding to the marked segment of the first audio signal, of the second audio signal. In detail, the file identification, the identifier, and the check code construct a character sequence. The character sequence is hidden in the first audio signal. In the character sequence, the locations of the file identification, the identifier, and the check code may include the following first to third status. The first status is that the identifier is on the front of the character sequence, the locations of the file identification and the check code is not limited. That is, the identifier is a head of the character sequence. The second status is that the identifier is divided into a first sub-identifier and a second sub-identifier. The first sub-identifier is on the front of the character sequence. The second sub-identifier is on the back of the character sequence. That is, the first sub-identifier is the head of the character sequence, and the second sub-identifier is a tail of the character sequence. The third status is that the identifier is divided into first to third sub-identifiers. The first sub-identifier is on the front of the character sequence. The second sub-identifier is on the back of the character sequence. The third sub-identifier is on the middle of the character sequence. That is, the first sub-identifier is the head of the character sequence, the second sub-identifier is a tail of the character sequence, and the third sub-identifier is middle section of the character sequence. Therefore, when the second terminal obtains the identifier, the locations of the file identification and the check code can be known, and the second terminals can obtain the file identification and the check code from the corresponding location.

In the embodiment, after the second terminal decodes the second audio signal, the second terminal can determine the location of the file identification and the check code through the identifier. The second terminal can obtain the second audio signal from the determined location. In detail, the second terminal decoding the second audio file to get the file identification includes the following contents.

The second terminal decodes the second audio signal to get the identifier, determines the location of the file identification and the check code through the identifier, and obtains the file identification and the check code from the determined location.

The second terminal determines whether a file identification character is correct through the check code. If the second terminal determines the file identification character is correct, the second terminal consider the file identification character as the file identification. If the second terminal determines the file identification character is incorrect, the second terminal corrects the file identification character through an error correction algorithm, and considers the corrected file identification character as the file identification. The file identification character may be a character of the file identification marked by the identifier.

Preferably, the file identification, the check code, and the identifier may be a character combination which is the same type, or a combination of multiply types (such as the combination of Arabic numerals and English letters). For example, the character combination composes of the Arabic numerals or the character combination composes of the English letters.

In the above-mentioned embodiment, the first terminal receives the file identification of the target file from the server. The first terminal generates a first audio signal, hides the file identification in the first audio signal to form a first signal, and plays the first signal. The second terminal samples at least a portion of the first signal to form a second audio signal, and decodes the second audio signal to get the file identification. The second terminal transmits the file identification to the server. The server transmits the target file to the second terminal according to the file identification. Therefore, the file transmission between two terminals only plays an audio signal to realize transmitting the file, which simplifies the file transmission process.

Figure 2:
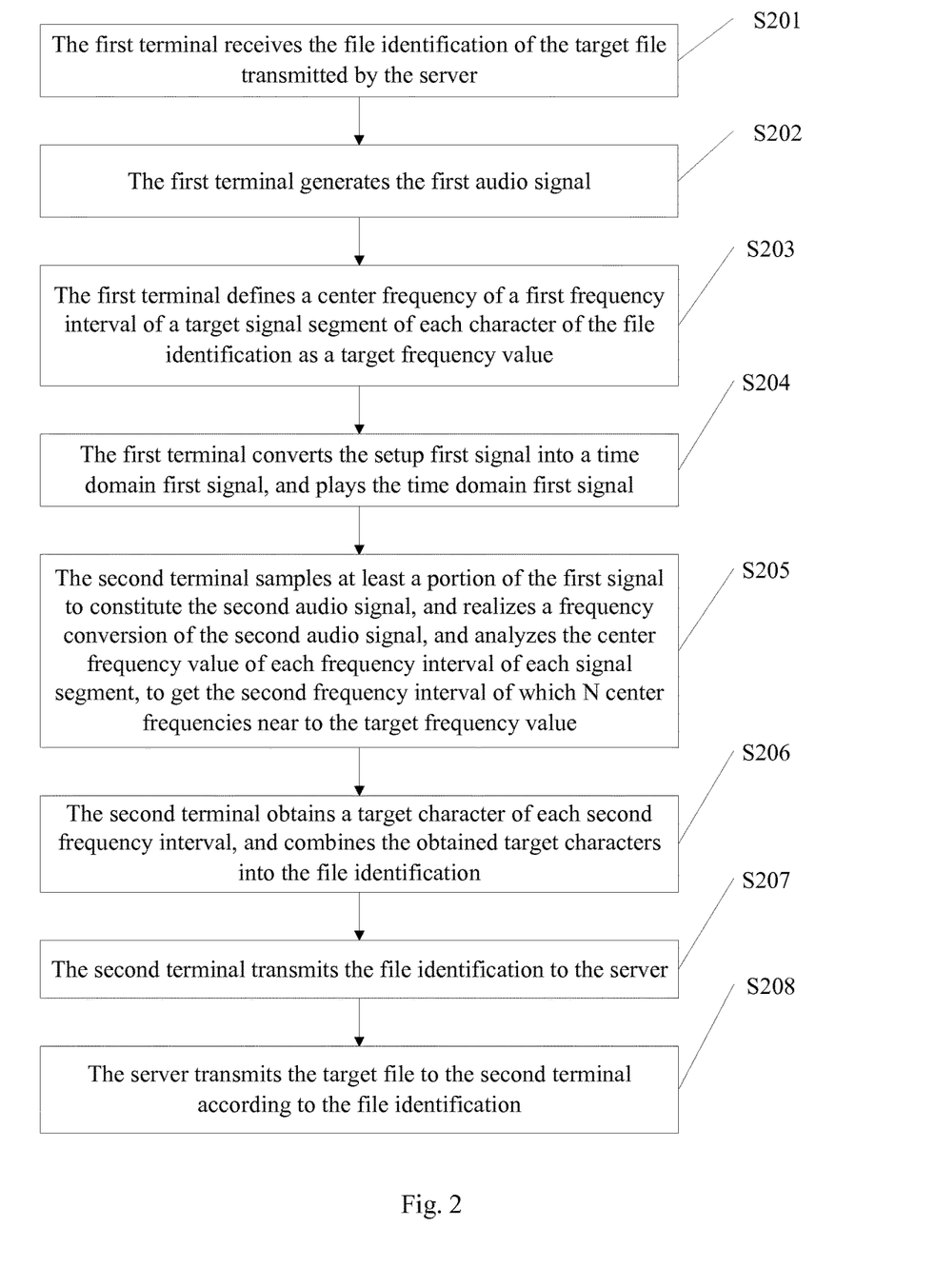
FIG. 2 is a flowchart of another example of a method for transmitting files based on an audio signal according to various embodiments.

Referring to FIG. 2, it is a flowchart of another example of a method for transmitting files based on audio signals. The method may include the following steps 201 to 203.

Step 201: the first terminal receives the file identification of the target file transmitted by the server.

Step 202: the first terminal generates the first audio signal, the first audio signal at least includes N signal segments. Each signal segment includes M frequency intervals. One frequency interval corresponds to one character used for constructing the file identification. Wherein, N is defined as the number of the characters of the file identification; M is defined as the number of the characters used for constructing the file identification.

Step 203: the first terminal defines a center frequency of a first frequency interval of a target signal segment of each character of the file identification as a target frequency value. The target signal segment of the character is a signal segment of which a location in N signal segments is the same as a location of the character in the file identification. The first frequency interval corresponds to the character.

Preferably, the first audio file can carry multiply files. That is, the first terminal can transmit multiply files to the second terminal through the first audio signal. The first audio signal at least includes N signal segments. Each signal segment includes M frequency intervals, which are pre-setup by the first terminal. That one frequency interval corresponding to one character for constructing the file identification is also pre-setup by the first terminal.

Preferably, one frequency interval corresponds to one character for constructing the file identification. That is, one frequency interval can be expressed as one character. For example, the characters for constructing the file identification are Arabic numerals. The characters include ten numbers, which are the Arabic numerals 0-9. That is, one frequency interval corresponds to one Arabic numeral. M is equal to ten. For example, the characters for constructing the file identification are English letters. The characters include twenty six characters, which are the English letters A-Z. That is, one frequency interval corresponds to one English letter. M is equal to twenty six. For example, the characters for constructing the file identification are Arabic numerals and English letters. The characters for constructing the file identification include thirty six characters, which are the Arabic numerals 0-9 and the English letters A-Z. That is, one frequency interval corresponds to one English letter. M is equal to thirty six.

For example, the first audio signal is defined as S. Suppose that a sampling rat of the first audio signal is defined as r. According to the sampling theorem, the maximum frequency of the first audio signal S is defined as: fmax=r/2. The first terminal extracts a frequency range [f0-fh] from a frequency range [0, fmax] of a signal segment of the N signal segments of the first audio signal. That is, the frequency range and a bandwidth is defined as: B=fh-f0. The frequency interval [f0, fh] is divided into M frequency intervals. Each frequency interval of the M frequency intervals represents one character. That is, each frequency interval corresponds to one character for constructing the file identification. The frequency interval [f0, fh] may be equally or unequally divided into the M frequency intervals. For example, the divided M frequency intervals may be the following M frequency intervals.

Q1:[f0, f1], Q2:[f1, f2], Q3:[f2, f3], . . . Qi:[fi−1,fi] . . . QM:[fM−1, fM]

Each frequency interval corresponds to one character. There are M intervals, which correspond to M characters. For example, the frequency interval Q1 corresponds to the Arabic numeral 0. The frequency interval Q2 corresponds to the Arabic numeral 1. The frequency interval QM (M=10) corresponds to the Arabic numeral 9. One signal segment of the N signal segments is shown. The other segments of the N signal segments can be divided into M frequency intervals according to the above-mentioned contents.

For example, when the file identification is defined as 1234, the N is equal to 4. The target signal segment of the first character 1 of the file identification is the first signal segment of the N signal segments. The first frequency interval of the character 1 is the second frequency interval (such as Q2:[f1, f2]). In the step 203, the center frequency of the first frequency interval is set to the target frequency value. Similarly, the center frequencies of the first frequency intervals of the following characters can be set. Namely, the file identification is hidden in the first audio signal. The N signal segments may be the N signal segments of which the location in the W signal segments of the first audio signal are continuous, since the first audio signal can carry different files, that is, the first audio signal can hide different file identifications, or hide the different file identifications with different lengths.

As a preferably embodiment, in the step 203, each character of the file identification can be consecutive multiple hidden in the first audio signal. For example, each character of the file identification is W consecutive hidden in the first audio signal. The first audio signal may at least include W×N signal segments. The first character of the file identification is hidden in the front W signal segments. The second character of the file identification is hidden in the w+1 signal segment to the W+W signal segment, to make each character of the file identification is hidden W times, which ensures that the second terminal can correctly decode the file identification. For example, the hidden file identification is 1234. In the step 203, can hide 1111111111222222222233333333334444444444, that is, each character is hidden ten times. However, the hidden can be changed through changing frequencies corresponding to the hidden of the M intervals. If the file identification is hidden many times in the step 203, the second terminal decodes the first audio signal through pre-obtained information of the first terminal hiding the file identification many times. That is, the second terminal decodes ten 1, the second terminal considers one of the ten 1 as the character of the file identification. Namely, the file identification decoded by the second terminal is still 1234.

Step 204: the first terminal converts the setup first signal into a time domain first signal, and plays the time domain first signal.

Preferably, the setup first signal is converted into the time domain first signal through overlap-add method.

Step 205: the second terminal samples at least a portion of the first signal to constitute the second audio signal, and realizes a frequency conversion of the second audio signal, and analyzes the center frequency value of each frequency interval of each signal segment, to get the second frequency interval of which N center frequencies near to the target frequency value. The second audio signal includes W signal segments. Each signal segment includes M frequency intervals. One frequency interval corresponds to one character for constructing the file identification.

Preferably, the second audio signal is formed through sampling the first signal, namely, the second audio signal approximate to the first signal. The first signal includes at least N signal segments. Each signal segment includes M frequency intervals. One frequency interval corresponds to one character for constructing the file identification. Therefore, the second terminal defines that the second audio signal at least includes N signal segments according the pre-obtained signal segment information of the first signal and information of the frequencies of each signal segment. And the location of each signal segment is the same as the location of signal segment of the first signal. For example, chronological order, the second terminal also can define the M frequency intervals of each signal segment of the second audio signal, and one frequency interval corresponds to one character for constructing the file identification. At the same time, the second audio signal at least includes N signal segments. Each signal segment includes M frequency intervals. One frequency interval corresponds to one character for constructing the file identification. The above-mentioned contents can be setup by the second terminal according to the information, setup by the first terminal, of the first audio signal.

Preferably, the length of the file identification is N. That is, the first terminal only defines the center frequency of one of the frequency intervals of each signal segment from the N signal segments as the target frequency value. Therefore, in the step 205, only N second frequency intervals can be analyzed.

Step 206: the second terminal obtains a target character of each second frequency interval, and combines the obtained target characters into the file identification. The target characters of the second frequency intervals are the characters corresponding to the second frequency intervals.

Preferably, the N second frequency intervals are obtained in the step 205. Therefore, in the step 206, the character corresponding to each second frequency used to be as the target character of the corresponding second frequency interval may be obtained. And the file identification is obtained through combining the N target characters.

Preferably, the combining the obtained target characters to get the file identification may includes the following contents.

The N target characters are combined into the file identification according to the location of the N second frequency intervals in the N signal segments. For example, N=4, namely, in the step 206, there are four target characters to be obtained. The four characters are combined into the file identification according to the locations of the second frequency intervals corresponding to the four characters in the N signal segments. For example, four second frequency intervals include frequency interval 1, frequency interval 2, frequency interval 3, and frequency interval 4. Wherein, the frequency interval 1 is the frequency interval of the first signal segment of the N signal segments. The frequency interval 2 is the frequency interval of the second signal segment of the N signal segments. The frequency interval 4 is the frequency interval of the fourth signal segment of the N signal segments. The four target characters are combined according to the following order:

the target character corresponding to the frequency interval 1, the target character corresponding to the frequency interval 2, the target character corresponding to the frequency interval 3, the target character corresponding to the frequency interval 4. During a process of combination, the locations of the target characters may be the same as the locations of the second frequency interval in the N signal segments. The location of the target characters also may be opposite to the location of the second frequency interval in the N signal segments in the second frequency interval. That is, the first character corresponds to the last frequency interval in the N signal segments.

Step 207: the second terminal transmits the file identification to the server.

Step 208: the server transmits the target file to the second terminal according to the file identification.

As a preferable embodiment, in the step 205, the second terminal realizing a frequency conversion of the second audio signal includes the following contents.

The second terminal realizes a frequency conversion of the second audio signal, and analyzes the frequency of the first signal segment of the second audio signal is a multiple of the frequency of the first signal segment of the first audio signal. The second terminal also adjusts the frequency of each signal segment of the second audio signal as the target frequency of the corresponding signal segment. The target frequency of the corresponding signal segment is equal to the frequency of the corresponding signal segment multiplies by the multiple. The first signal segment is any signal segment of the N signal segments. For example, the second terminal analyzes the frequency of the first signal segment of the second audio signal is the multiple of the frequency of the first signal segment of the first audio signal. That is, the frequency of the first signal segment of the second audio signal is defined as fix', the frequency of the first signal segment of the first audio signal is defined as fix. The multiple is defined as c=fix/fix'.

In the step 205, the frequency of each signal segment of the second audio signal is adjusted as the target frequency, to realize distortion compensation during the process of sampling.

As a preferable embodiment, in the step 203, the file identification, the identifier, and the check code are hidden in the first audio signal. A process of hiding the identifier and the check code can be referred to the process of hiding the file identification. The identifier is used to mark the signal segment of the first character of the file identification hidden in the first audio signal. The second terminal can directly obtain the file identification from the signal segment marked by the identifier, to reduce workload of the second terminal. At the same time, in the steps 205 and 206, the process of obtaining the identifier and the check code can be referred to the process of obtaining the file identification.

In the above-mentioned embodiments, the embodiments of variously hiding file identification are described in detail, which can simple the process of transmitting files.

Figure 3:
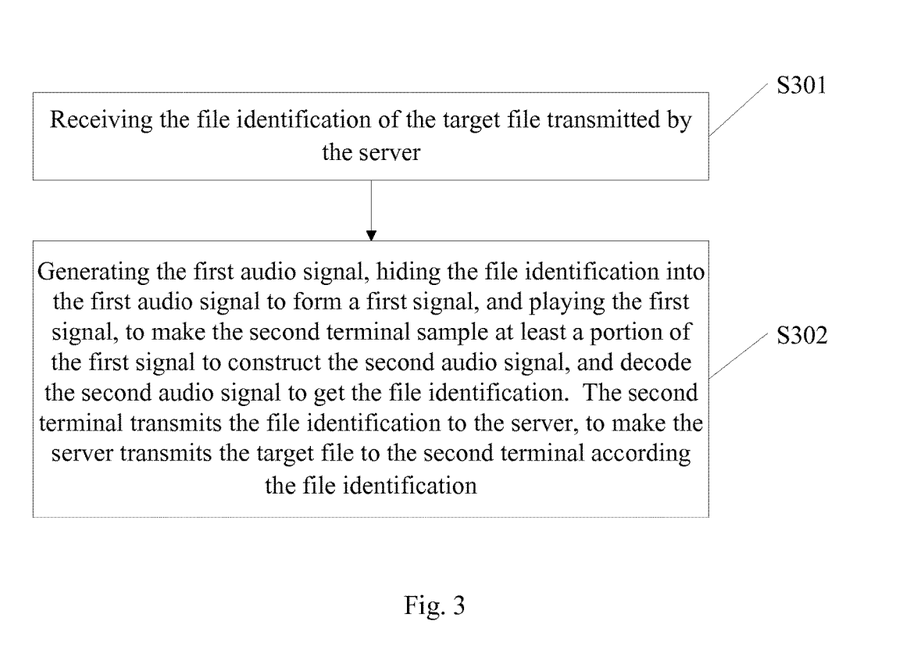
FIG. 3 is a flowchart of yet another example of a method for transmitting files based on an audio signal according to various embodiments.

Referring to FIG. 3, it is a flowchart of yet another example of a method for transmitting files based on audio signals. The method may include the following steps 301 and 302.

Step 301: receiving the file identification of the target file transmitted by the server.

Step 302: generating the first audio signal, hiding the file identification into the first audio signal to form a first signal, and playing the first signal, to make the second terminal sample at least a portion of the first signal to construct the second audio signal, and decode the second audio signal to get the file identification. The second terminal transmits the file identification to the server, to make the server transmits the target file to the second terminal according the file identification.

Preferably, the method is applied to the first terminal, and the first terminal can implement the method. The method can be understood as the method implemented by the first terminal from one side. That is, the steps of the above-mentioned embodiment all can be implemented by the first terminal.

In the embodiment, receiving the file identification of the target file transmitted by the server; hiding the file identification into the first audio signal to form a first signal, and playing the first signal, to make the second terminal sample at least a portion of the first signal to construct the second audio signal, and decode the second audio signal to get the file identification. And the second terminal transmits the file identification to the server, to make the server transmits the target file to the second terminal according the file identification. Therefore, transmitting files between two terminals only needs play an audio signal, and hiding the files in the audio signal, which simples the process of transmitting files.

Figure 4:
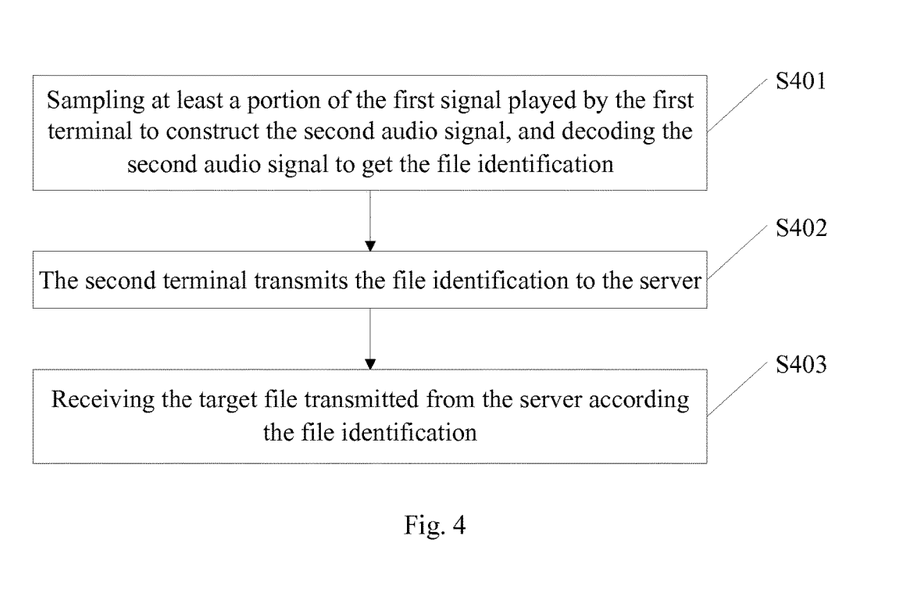
FIG. 4 is a flowchart of yet another example of a method for transmitting files based on an audio signal according to various embodiments.

Referring to FIG. 4, it is a flowchart of yet another example of a method for transmitting files based on audio signals. The method may include the following steps 401 to 403.

Step 401: sampling at least a portion of the first signal played by the first terminal to construct the second audio signal, and decoding the second audio signal to get the file identification. The file identification is the file identification of the target file hidden in the first audio signal. The file identification of the target file is the file identification transmitted from the server to the first terminal.

Step 402: the second terminal transmits the file identification to the server.

Step 403: receiving the target file transmitted from the server according the file identification.

Preferably, the method is applied to the second terminal, and the second terminal can implement the method. The method can be understood as the method implemented by the second terminal from one side. That is, the steps of the above-mentioned embodiment all can be implemented by the second terminal.

In the embodiment, the second terminal samples at least a portion of the first signal played by the first terminal to construct the second audio signal, and decodes the second audio signal to get the file identification. The file identification is the file identification of the target file hidden in the first audio signal. The file identification of the target file is the file identification transmitted from the server to the first terminal. The second terminal transmits the file identification to the server. The server transmits the target file to the second terminal according to the file identification. Therefore, transmitting files between two terminals only needs play an audio signal, and hiding the files in the audio signal, which simples the process of transmitting files.

The following embodiment is a system embodiment. The system embodiment is used to implement the all above-mentioned method embodiments. For the description, FIG. 5 only shows a portion of contents related to the system embodiments, not shows the technical detail, please referring to first to third embodiments.

Figure 5:
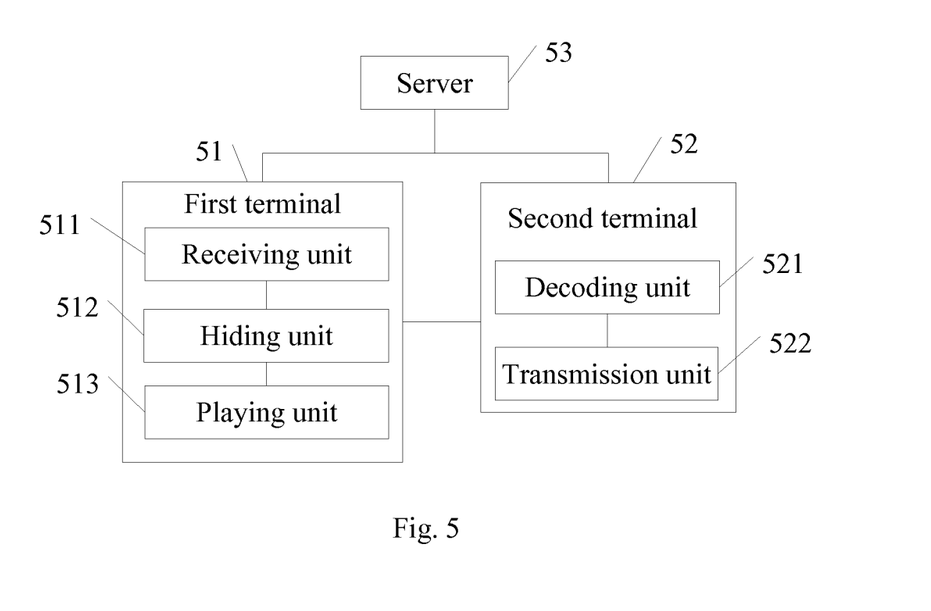
FIG. 5 is a block diagram of an example of a system for transmitting files based on an audio signal according to various embodiments.

Referring to FIG. 5, it is a block diagram of an example of a system for transmitting files based on audio signals according to various embodiments. The system includes a first terminal 51, a second terminal 52, and a server 53.

The first terminal 51 includes a receiving unit 511, a hiding unit 512, and a playing unit 513.

The receiving unit 511 is used to receive a file identification of a target file transmitted by the server 53.

The hiding unit 512 is used to generate a first audio signal, and hide the file identification into the first audio signal to form a first signal.

The playing unit 513 is used to play the first signal.

The second terminal 52 includes a decoding unit 521 and transmission unit 522.

The decoding unit 521 is used to sample at least a portion of the first signal to construct the second audio signal, and decode the second audio signal to get the file identification.

The transmission unit 522 is used to transmit the file identification to the server 53.

The server 53 is used to transmit the target file to the second terminal according to the file identification.

Preferably, the first and second terminals may be equipments having audio hardware, such as mobile phones, table personal computers, computers, music players (such as MP3, MP4, MP5).

Preferably, the target file may be files that can be stored in the first and second terminals, such as an audio file, a video file, an image file, a document file.

As a preferably embodiment, the hiding unit 512 can hide the file identification, a check code and an identifier in the first audio signal. The first terminal 51 may generate the check code, or the first terminal 51 consults with the second terminal 52 in advance to generate the check code together. The identifier is used to mark a location of hiding the file identification and the check code.

Preferably, the decoding unit 521 decodes the second audio signal to get the identifier, determines the location of the file identification and the check code through the identifier, and obtains the file identification and the check code from the determined location. The decoding unit 521 determines whether a file identification character is correct through the check code. If the decoding unit 521 determines the file identification character is correct, the decoding unit 521 considers the file identification character as the file identification. If the decoding unit 521 determines the file identification character is incorrect, the decoding unit 521 corrects the file identification character through an error correction algorithm, and considers the corrected file identification character as the file identification.

Preferably, the file identification, the check code, and the identifier may be a character combination which is the same type, or a combination of multiply types (such as the combination of Arabic numerals and English letters).

As a preferable embodiment, the first audio signal at least includes N signal segments. Each signal segment includes M frequency intervals. One frequency interval corresponds to one character for constructing the file identification. N is defined as the number of the characters of the file identification. M is defined as the number of the characters for constructing the file identification.

The hiding unit 512 is also used to define the center frequency of the first frequency interval of the target signal segment of each character of the file identification as the target frequency value. The target signal segment of the character is the signal segment of which the location in N signal segments is the same as the location of the character in the file identification. The first frequency interval corresponds to the frequency interval corresponding to the character. The hiding unit 512 is also used to convert the setup first signal into a time domain first signal, and plays the time domain first signal.

Preferably, the second audio signal at least includes N signal segments. Each signal segment includes M frequency intervals. One frequency interval corresponds to one character for constructing the file identification.

The decoding unit 521 is also used to realize a frequency conversion of the second audio signal, and analyze the center frequency value of each frequency interval of each signal segment, to get the second frequency interval of which N center frequencies near to the target frequency value. The decoding unit 521 is also used to obtain the target character of each second frequency interval, and combines the obtained target characters into the file identification. The target characters of the second frequency intervals are the characters corresponding to the second frequency intervals.

As a preferable embodiment, the decoding unit 521 is also used to realizes the frequency conversion of the second audio signal, and analyzes the frequency of the first signal segment of the second audio signal is a multiple of the frequency of the first signal segment of the first audio signal. The decoding unit 521 also adjusts the frequency of each signal segment of the second audio signal as the target frequency of the corresponding signal segment. The target frequency of the corresponding signal segment is equal to the frequency of the corresponding signal segment multiplies by the multiple. The first signal segment is any signal segment of the N signal segments.

In the above-mentioned embodiment, the first terminal 51 receives the file identification of the target file from the server 53. The first terminal 51 generates a first audio signal, hides the file identification in the first audio signal to form a first signal, and plays the first signal. The second terminal 52 samples at least a portion of the first signal to form a second audio signal, and decodes the second audio signal to get the file identification. The second terminal 52 transmits the file identification to the server 53. The server 53 transmits the target file to the second terminal 52 according to the file identification. Therefore, the file transmission between two terminals only plays an audio signal to realize transmitting the file, which simplifies the file transmission process.

A person having ordinary skills in the art can realize that part or whole of the processes in the methods according to the above embodiments may be implemented by a computer program instructing relevant hardware. The program may be stored in a computer readable storage medium. When executed, the program may execute processes in the abovementioned embodiments of methods. The storage medium may be a magnetic disk, an optical disk, a Read-Only Memory (ROM), a Random Access Memory (RAM), et al.

The above descriptions are some exemplary embodiments of the invention, and should not be regarded as limitation to the scope of related claims. A person having ordinary skills in a relevant technical field will be able to make improvements and modifications within the spirit of the principle of the invention. The improvements and modifications should also be incorporated in the scope of the claims attached below.

What is claimed is:

1. A method for transmitting files based on an audio signal by a first terminal, comprising:
   receiving a file identification of a target file transmitted by a server;
   generating a first audio signal;
   hiding the file identification in the first audio signal to form a first signal; and
   playing the first signal, to make a second terminal sample at least a portion of the first signal to construct a second audio signal, and decode the second audio signal to get the file identification, transmit the file identification to the server, and obtain the target file transmitted by the server according to the file identification; wherein the first audio signal at least comprises N signal segments, each signal segment comprises M frequency intervals, one frequency interval corresponds to one character configured to construct the file identification, N is defined as the number of the characters of the file identification, M is defined as the number of the characters configured to construct the file identification, and wherein the step of hiding the file identification in the first audio signal to form a first signal comprises:
   defining a center frequency of a first frequency interval of a target signal segment of each character of the file identification as a target frequency value, wherein the target signal segment of the character is a signal segment of which a location in the N signal segments is the same as a location of the character in the file identification, the first frequency interval corresponds to the character;
   converting a setup first signal into a time domain first signal; and
   playing the time domain first signal.

2. A method for transmitting files based on an audio signal, comprising:
   sampling at least a portion of a first audio signal played by a first terminal to construct a second audio signal;
   decoding the second audio signal to get a file identification, wherein the file identification is a file identification used to hide a target file in the first audio signal, the file identification is a file identification transmitted from a server to the first terminal;
   transmitting the file identification to the server; and
   receiving the target file transmitted by the server according to the file identification; wherein the second audio signal comprises N signal segments, each signal segment comprises M frequency intervals, one frequency interval corresponds to one character configured to construct the file identification; and wherein the step of decoding the second audio signal to get the file identification comprises:
   realizing a frequency conversion of the second audio signal, and analyzing a center frequency value of each frequency interval of each signal segment, to get second frequency intervals of which N center frequencies near to the target frequency value; and
   obtaining a target character of each second frequency interval, and combining the obtained target characters into the file identification, wherein the target characters of the second frequency intervals are the characters corresponding to the second frequency intervals.

3. The method according to claim 2, wherein the step of realizing a frequency conversion of the second audio signal comprises:

realizing the frequency conversion of the second audio signal;

analyzing a multiple of the frequency of a first signal segment of the second audio signal and the frequency of the first signal segment of the first audio signal;

adjusting the frequency of each signal segment of the second audio signal to the target frequency of the corresponding signal segment, wherein the target frequency of the corresponding signal segment is equal to the frequency of the corresponding signal segment multiplies by the multiple, the first signal segment is any signal segment of the N signal segments.

4. The method according to claim 2, wherein the first audio signal at least comprises N signal segments, each signal segment comprises M frequency intervals, one frequency interval corresponds to one character configured to construct the file identification, N is defined as the number of the characters of the file identification, M is defined as the number of the characters configured to construct the file identification.

5. A first terminal, comprising:

a receiving unit configured to receive a file identification of a target file transmitted by a server;

a hiding unit configured to generate a first audio signal, and hide the file identification in the first audio signal to form a first signal; and a playing unit configured to play the first signal to make a second terminal sample at least a portion of the first signal to construct a second audio signal, and decode the second audio signal to get the file identification, transmit the file identification to a server, and obtain the target file transmitted by the server according to the file identification; wherein the first audio signal at least comprises N signal segments, each signal segment comprises M frequency intervals, one frequency interval corresponds to one character configured to construct the file identification, N is defined as the number of characters of the file identification, M is defined as the number of the characters for constructing the file identification, wherein the hiding unit is further configured to define a center frequency of a first frequency interval of a target signal segment of each character of the file identification as a target frequency value, the target signal segment of the character is a signal segment of which a location in the N signal segments is the same as a location of the character in the file identification, the first frequency interval corresponds to a frequency interval corresponding to the character, convert a setup first signal into a time domain first signal, and play the time domain first signal.

\* \* \* \* \*